United States Patent [19]

Hall et al.

[11] 4,066,285

[45] Jan. 3, 1978

[54] ORNAMENTAL PROTECTIVE TRIM STRIP FOR MOTOR VEHICLES

[75] Inventors: Daniel L. Hall, Citrus Heights; Neal Duane Dunivan, Roseville, both of Calif.

[73] Assignee: Trim-Line, Inc., North Highlands, Calif.

[21] Appl. No.: 748,909

[22] Filed: Dec. 9, 1976

[51] Int. Cl.$^2$ .................. B60R 19/00; E04F 19/02
[52] U.S. Cl. .......................... 293/62; 293/1; 52/716; 280/770
[58] Field of Search .......... 293/1, 62, 71, DIG. 4; 52/716, 717, 718, 287 (U.S. only), 288 (U.S. only); 280/770; 296/152

[56] References Cited

U.S. PATENT DOCUMENTS

| | | | |
|---|---|---|---|
| 2,910,033 | 10/1959 | Weisburg | 52/717 |
| 3,290,082 | 12/1966 | Fritsch | 293/1 |
| 3,388,523 | 6/1968 | Evans | 296/152 X |
| 3,606,432 | 9/1971 | Honatzis | 293/1 |
| 3,752,521 | 8/1973 | Lafebre | 293/1 |
| 3,775,926 | 12/1973 | Brown et al. | 52/717 |

*Primary Examiner*—Trygve M. Blix
*Assistant Examiner*—Edward M. Wacyra
*Attorney, Agent, or Firm*—Lothrop & West

[57] ABSTRACT

An extruded aluminum channel is formed with a wide central T-shaped groove and narrower outer T-shaped grooves transversely spaced on opposite sides of the central groove. A resilient vinyl bumper insert is formed with T-shaped in section projections which interlock in the outer grooves of the channel thereby securing the bumper to the channel. End caps are formed with tapered tangs which tightly fit into the central groove of the channel thereby securely fitting the end caps to the opposite ends of the channel. The ends of the channel and the corresponding end caps may be either square or slanted. The tangs of the end caps are formed with holes for fasteners such as pop rivets which extend through the holes in the tangs and also through registering holes drilled in the channel to attach the trim strip to a motor vehicle.

6 Claims, 6 Drawing Figures

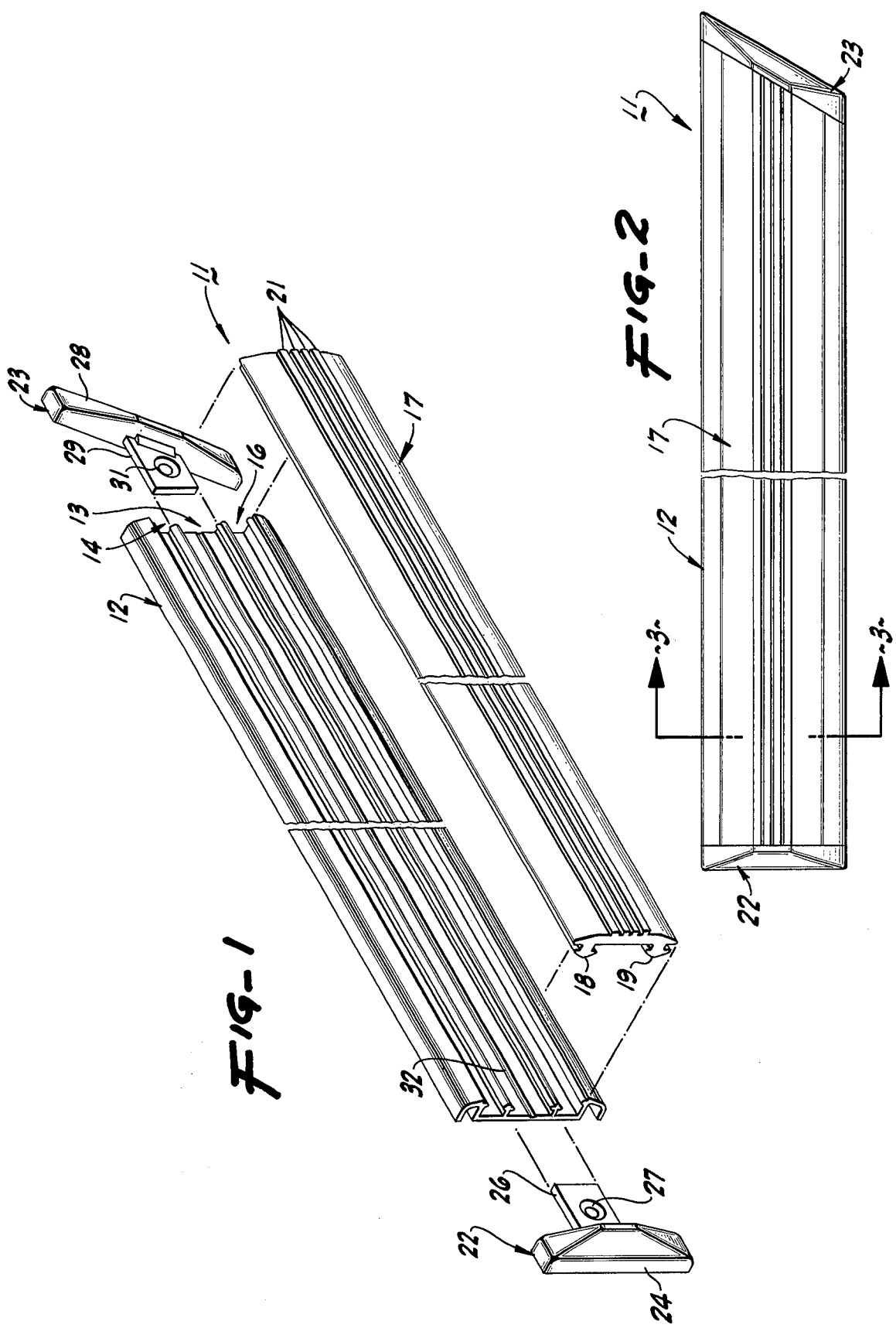

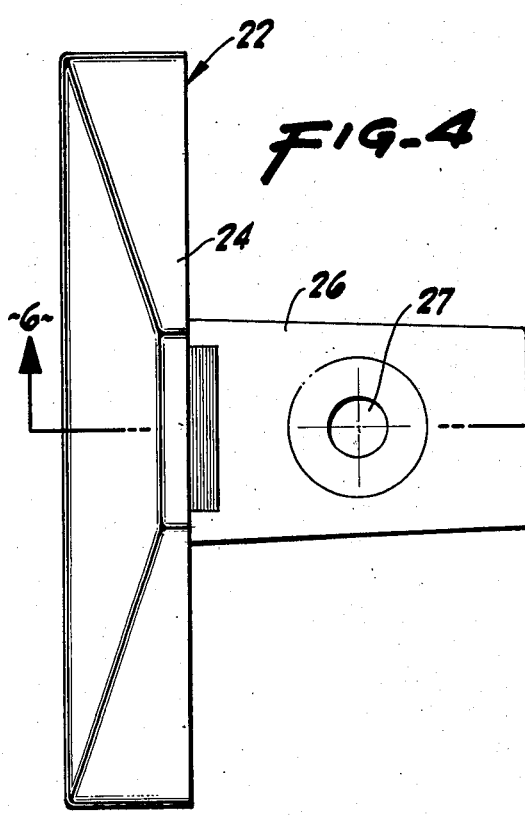
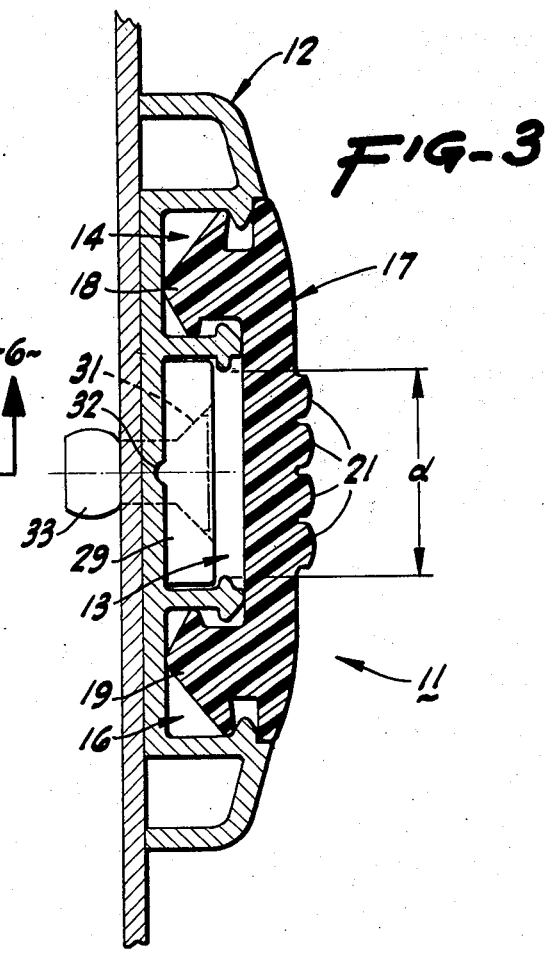
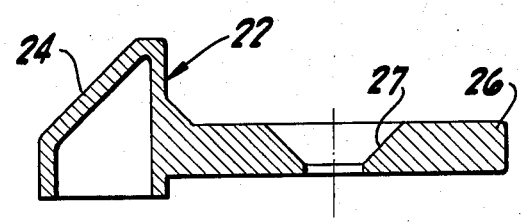
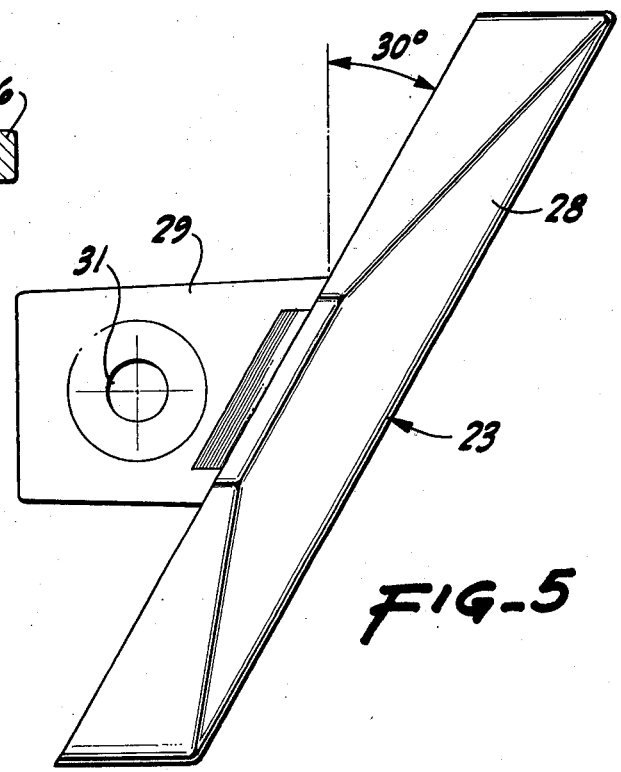

ORNAMENTAL PROTECTIVE TRIM STRIP FOR MOTOR VEHICLES

BACKGROUND OF THE INVENTION

It is well known in the art to affix trim strips to the sides of motor vehicles to protect the paint work of the vehicle from damage caused by impact of opening car doors in parking lots and the like. The trim strips protrude from the sides of the motor vehicles to intercept the impacting object. The simplest trim strips are merely strips of aluminum or the like which are screwed or similarly fastened to the motor vehicle sides. These trim strips suffer from the drawback of non-resilience in that although they protect the paint work of the motor vehicle they themselves become battered and disfigured from impact.

An improved trim strip comprises an extruded aluminum channel with an outwardly concave shape and a rubber bumper insert configured to be fittingly retained by the channel. The bumper insert protrudes from the channel so as to receive impact and resists disfiguration due to its resilience. In order to prevent axial disengagement of the bumper insert from the channel, end caps are firmly secured to the opposite ends of the channel. Typical trim strips of this general type are disclosed in U.S. Pat. Nos. 3,606,432 and 3,752,521.

However, various problems have remained heretofore unsolved in the construction of the trim strips such as those disclosed in the above patents. Owing to the extremely thin metal presently being used in the construction of bodies and doors of passenger automobiles and the correspondingly low resistance to buckling, even if a prior art trim strip is provided on a vehicle door a relatively small impact to the trim strip transmitted to the vehicle door may under some circumstances be sufficient to buckle the adjacent door or body material, crack the paint and possibly leave a permanent dent.

Although a solution to the problem is to make the trim strip wider in order to distribute the impact force over a larger area, the prior art construction makes the embodiment of this concept relatively expensive due to the increased mass of the larger resilient bumper insert.

Another drawback of the particular trim strips disclosed in the above patents is the relatively complex configuration of the end caps which are designed for rigid attachment to the channel, such end caps being expensive to manufacture.

SUMMARY OF THE INVENTION

The present invention relates to an ornamental protective trim strip for motor vehicles.

The invention essentially provides an extruded aluminum channel formed with a relatively wide, central, elongated, T-shaped groove and two narrower, outer, parallel, T-shaped grooves transversely spaced on opposite sides of the central groove. A relatively wide vinyl bumper insert is formed with T-shaped projections which interlockingly fit into the outer grooves of the channel. End caps are formed with tangs which firmly fit into the central groove to secure the end caps to the opposite ends of the channel.

It is an object of the invention to provide an improved protective trim strip for motor vehicles which is wider and has a greater impact absorbing capacity than prior art trim strips but avoids the incorporation of an overly bulky and expensive resilient bumper insert.

It is another object of the invention to provide a trim strip comprising end caps so constructed as securely to fit on the ends of a channel and readily and firmly to attach the trim strip to the side of a motor vehicle.

It is a further object of the invention to provide a trim strip in which the resilient bumper insert is relatively thin, in the interests of economy and attractive appearance, yet is capable of absorbing high impact forces owing to the provision of an underlying groove, or recess, into which the prominent portion of the bumper insert can resiliently flex as impact occurs, the flexure serving to absorb a large portion of the impact energy.

It is another object of the present invention to provide a generally improved ornamental protective trim strip for motor vehicles.

Other objects, together with the foregoing, are attained in the embodiment described in the following description and illustrated in the accompanying drawings.

BRIEF DESCRIPTION OF THE DRAWING

FIG. 1 is an exploded perspective view of a short length of trim strip embodying the present invention;

FIG. 2 is a fragmentary front elevational view of an assembled trim strip constructed pursuant to the invention;

FIG. 3 is a sectional view, to a greatly enlarged scale, of the trim strip, the section being taken on the line 3 — 3 in FIG. 2, a fastener being shown in outline;

FIG. 4 is a plan view, to an enlarged scale, of a square end cap of the trim strip;

FIG. 5 is a plan view to an enlarged scale, of a slanted end cap of the trim strip; and, FIG. 6 is a sectional view of the square end cap taken on the line 6 — 6 of FIG. 4.

DESCRIPTION OF THE PREFERRED EMBODIMENT

While the ornamental protective trim strip of the invention is susceptible of numerous physical embodiments, depending upon the environment and requirements of use, substantial numbers of the herein shown and described embodiment have been made, tested and used, and all have performed in an eminently satisfactory manner.

With particular reference to FIG. 1 of the drawings, an ornamental protective trim strip of the invention is generally designated by the reference numeral 11 and includes an elongated, extruded aluminum channel 12. The channel 12 is formed with a wide, central, generally T-shaped groove 13 and two narrower generally T-shaped grooves 14 and 16 transversely spaced on opposite sides of the central groove 13.

The trim strip 11 further comprises a resilient molded vinyl bumper insert 17 formed with two generally T-shaped in section projections 18 and 19 extending along the entire length of the bumper insert 17 as do the grooves 13, 14 and 16 of the channel 12. The shapes of the projections 18 and 19 are conjugate to the shapes of the outer grooves 14 and 16 so that when the bumper insert 17 is pressed onto the channel 12 the projections 18 and 19 resiliently interlock in the respective grooves 14 and 16 in order securely to attach the bumper insert 17 to the channel 12. This interlocking engagement is best illustrated in the sectional view of FIG. 3.

The bumper insert 17 is further formed with at least one, and here shown as four, external ribs 21. Although the bumper insert 17 may be made much wider than the bumper inserts of the prior art so as to distribute impact force over a larger area, it is to be noted that as a consequence of the unique mounting arrangement of the projections 18 and 19 and the grooves 13, 14 and 16, the bumper insert is relatively thin and inexpensive to manufacture.

The impact absorbing effect is maximized if the external ribs 21 on the bumper insert 17 extends transversely no farther outwardly than the transverse innermost portion of the central groove 13 indicated as "d" in FIG. 3. In this manner, an inward impact force on the ribs 21 will cause the portion of the bumper insert 17 on which the ribs 21 are formed resiliently to deform into the central groove 13 thereby absorbing the impact force. The portions of the bumper insert 17 transversely outwardly of the ribs 21 will receive impact force only after the ribs 21 have been deformed inwardly to the extent that the surface of the ribs 21 is flush with the portions of the bumper insert 17 transversely outwardly of the ribs 21. In this manner, the unique shape of the bumper insert 17 provides an impact absorbing capacity which is obtainable in prior art trim strips only with a bulky and expensive bumper insert.

In order to prevent the bumper insert 17 from axially disengaging from the channel 12 left and right end caps 22 and 23, which are transversely coextensive with the channel 12, are firmly secured to the opposite ends of the channel 12. As best seen in FIGS. 4 to 6, the left end cap 22 comprises a cap body 24 and a tapered tang 26 which extends from the cap body 24. The tang 26 is formed with a beveled fastener hole 27. The right end cap 23 similarly comprises a cap body 28 and a tapered tang 29 extending from the cap body 28, the tang 29 being formed with a beveled fastener hole 31.

The tangs 26 and 29 are designed to have a width slightly greater than the width of the bottom of the central groove 13 of the channel 12 where the tangs 26 and 29 are connected to the cap bodies 24 and 28, respectively, and taper off to a width slightly smaller than the width of the groove 13.

As shown in the drawings, the left-hand end of the channel 12 is formed squarely and the right-hand end of the channel 12 is formed slanted at an angle of, for example, 30° to the vertical. The cap body 24 of the left end cap 22 is formed squarely to fit snugly against the left-hand end of the channel 12 and the cap body 28 of the right end cap 23 is formed slanted at the same angle as the right-hand end of the channel 12 in order to fit snugly thereagainst. Although the cross section of the right end cap 23 is not illustrated, it is essentially similar to the cross section of the left end cap 22 shown in FIG. 6.

Both the channel 12 and the resilient bumper insert 17 can be supplied in long lengths so that they can conveniently be cut in the shop, if necessary, to correspond to the dimensions of the motor vehicle door, fender or the like on which the trim strip is to be mounted. Although the trim strip 11 is illustrated as being formed with one square end and one slanted end, both ends may either be square or slanted, as required.

After the channel 12 is cut to the proper length the end caps 22 and 23 are pressed onto the opposite ends of the channel 12, with the tapered tangs 26 and 29 located in the central groove 13 of the channel 12. Owing to their configuration and dimensions the tangs are tightly press fitted into the groove 13 when the cap bodies 24 and 28 abut against the opposite ends of the channel 12, respectively.

With the end caps 22 and 23 securely lodged in an interference fit in the channel 12, the assembly is held against the body of the motor vehicle in the desired position. The channel 12 and vehicle body are then drilled through the centers of the holes 27 and 31 of the respective end caps 22 and 23 and pop rivets 33, or other suitable fasteners, such as sheet metal screws, are inserted through the holes and engaged so as firmly to secure the end caps 22 and 23 and channel 12 to the vehicle body. The channel 12, if desired, may be advantageously formed with a narrow longitudinal groove 32 in the bottom of the recess 13 to prevent transverse movement of the drill bit when drilling through the channel 12. After the channel 12 with assembled end caps 22 and 23 are firmly secured to the vehicle body, the bumper insert 17, having been cut to the same length as the channel 12, is pressed thereon as shown in FIG. 3 to form the complete trim strip 11.

In summary, it will be seen that the invention provides an ornamental protective trim strip for motor vehicles which is not only pleasing in appearance but which affords greater impact protection, is simpler in construction and less expensive to manufacture and install than prior art trim strips.

What is claimed is:
1. A protective trim strip comprising:
  a. an elongated channel extending between a first end and a second end, said channel being formed with a central longitudinal generally T-shaped in cross-section groove and first and second longitudinal outer generally T-shaped in cross-section grooves transversely spaced on opposite sides of said central groove, said grooves extending between said ends of said channel;
  b. an elongated resilient bumper extending axially coextensively with said channel and being formed with first and second generally T-shaped in cross-section projections interlocking with the walls of said first and second outer grooves of said channel, respectively, for securing said resilient bumper to said channel, said bumper extending over said central groove; and,
  c. first and second end caps formed with tangs providing an interference fit with the walls of said central groove of said channel to secure said first and second end caps to said first and said second ends of said channel, respectively.
2. A trim strip as in claim 1 in which said tangs of said first and said second end caps are formed with fastener holes.
3. A trim strip as in claim 1 in which said first and said second end caps extend transversely coextensively with said channel.
4. A trim strip as in claim 1 in which said first end of said channel and the respective first end of said resilient bumper are formed squarely and said second end of said channel and the respective second end of said resilient bumper are formed slanted, said first and second end caps being formed squarely and slanted conjugate to said first and said second ends of said channel, respectively.
5. A trim strip as in claim 1 in which said resilient bumper is formed with at least one external longitudinally extending rib transversely disposed between transversely innermost portions of said central groove of said channel
6. A trim strip as in claim 1 in which said tangs of said first and said second end caps are tapered in width.

* * * * *